J. M. PETERSON.
SAUSAGE STUFFER.
APPLICATION FILED MAR. 23, 1917.
1,234,935.
Patented July 31, 1917.
3 SHEETS—SHEET 3.
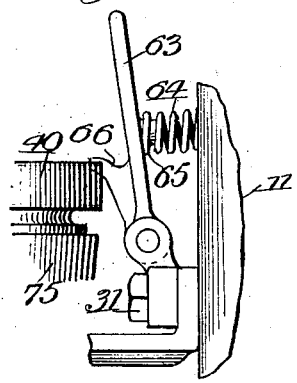
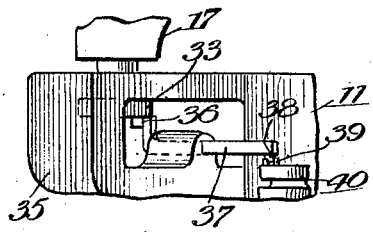
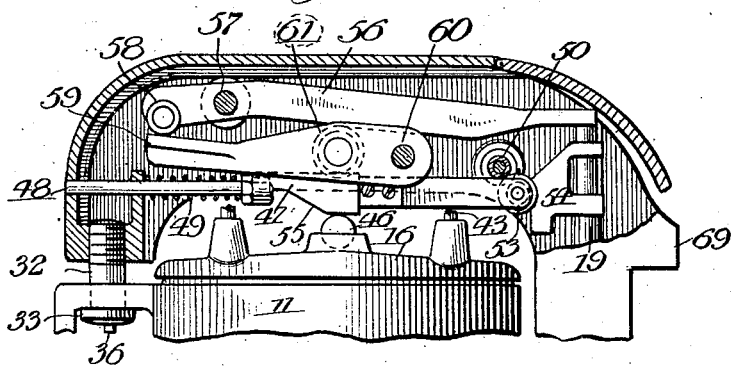
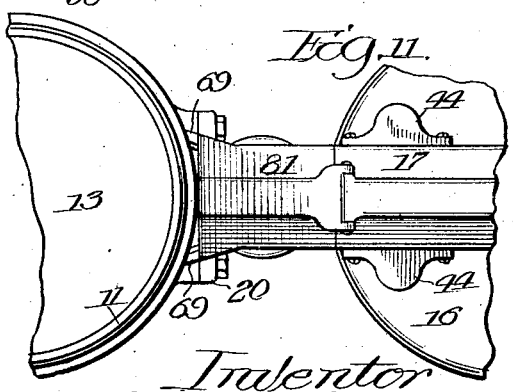
Inventor
John M. Peterson
by Max W Zabel Atty.

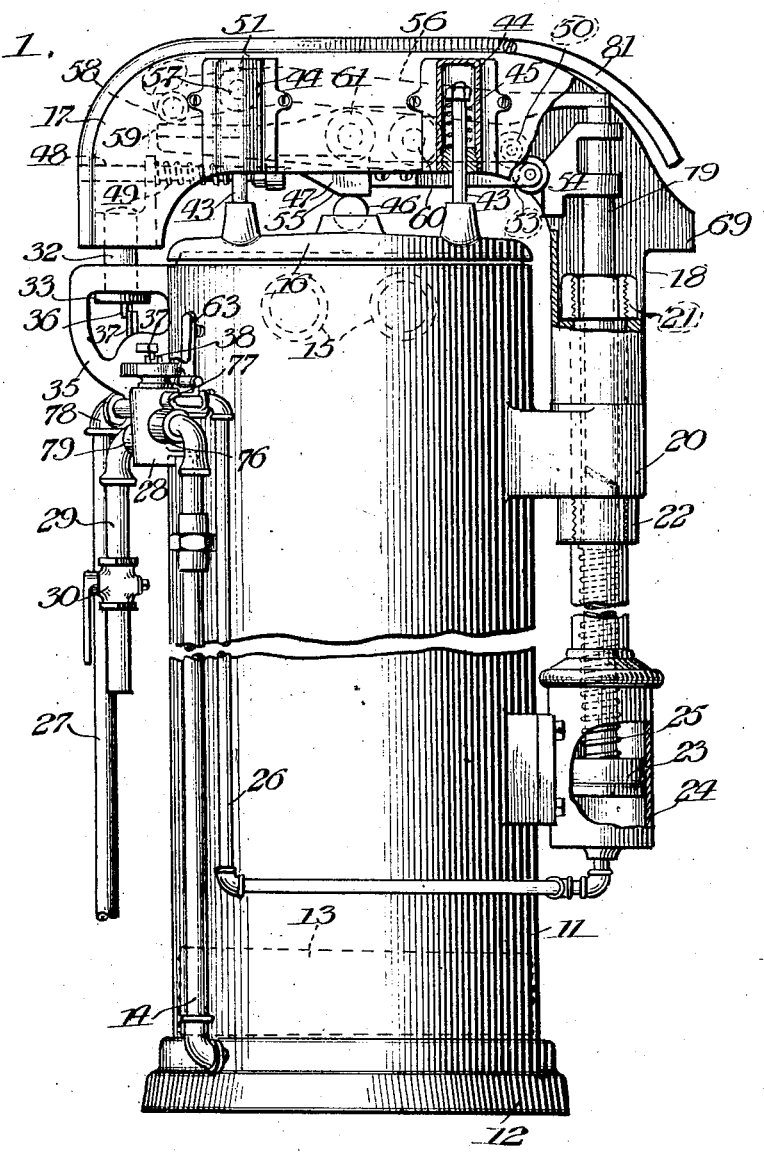

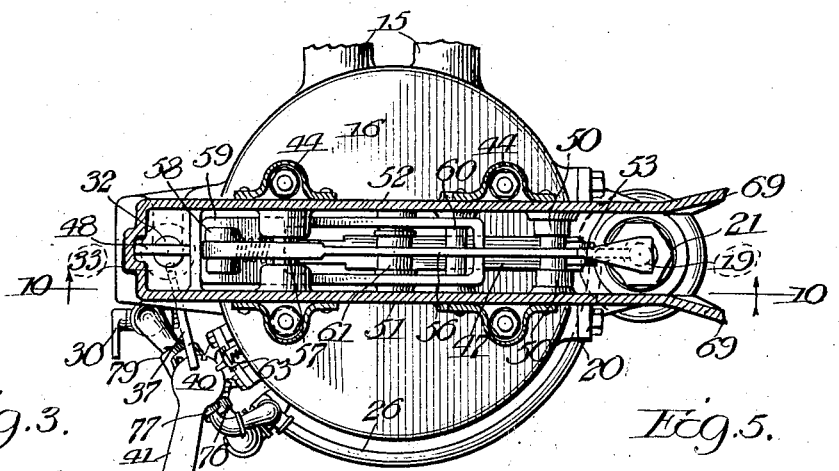

UNITED STATES PATENT OFFICE.

JOHN M. PETERSON, OF CHICAGO, ILLINOIS, ASSIGNOR TO GEORGE J. SAYER, OF CHICAGO, ILLINOIS.

SAUSAGE-STUFFER.

1,234,935.  Specification of Letters Patent.  Patented July 31, 1917.

Application filed March 23, 1917. Serial No. 156,831.

*To all whom it may concern:*

Be it known that I, JOHN M. PETERSON, a citizen of the United States, residing at Chicago, in the county of Cook and State of Illinois, have invented a certain new and useful Improvement in Sausage-Stuffers, of which the following is a full, clear, concise, and exact description, reference being had to the accompanying drawings, forming a part of this specification.

My invention relates to sausage stuffers, and has for its object the provision of an improved sausage stuffer in which improved automatic means are provided to prevent connecting the cylinder with a source of pressure unless the cylinder head is in proper position and locked. Means are also provided to render the automatic control devices temporarily inoperative should it be desired to remove the piston from the cylinder for cleaning purposes. Interlocking means are also provided between the cylinder head support and the cylinder to prevent the removal of the piston unless the cylinder head support is in a certain given position.

In connection with this structure I have designed a valve which is of particular utility to control the various instrumentalities above outlined, although these instrumentalities may of course be otherwise controlled than through the agency of such a valve. This valve structure is also of use for other purposes and therefore forms the subject matter of an independent co-pending application Serial No. 156,832, filed March 23, 1917.

I will describe one form which my invention may take more in detail by referring to the accompanying drawings, in which—

Figure 1 is a side view of my improved device, certain parts being broken away more clearly to reveal features of construction;

Fig. 2 is a top view of the device, the upper wall of the cylinder head supporting casing being broken away to reveal the operating levers and other instrumentalities;

Fig. 3 is an enlarged view of the valve mechanism shown in Fig. 1;

Fig. 4 is a sectional view on line 5—5 of Fig. 7;

Fig. 5 is a sectional view on line 5—5 of Fig. 7 showing the parts in a different position;

Fig. 6 is a sectional view on line 6—6 of Fig. 7;

Fig. 7 is a side view of the valve structure, the valve casing being shown in section;

Figs. 8 and 9 are detail views of the mechanism adapted to hold the valve against movement under certain conditions;

Fig. 10 is a sectional view on line 10—10 of Fig. 2;

Fig. 11 is a fragmentary top view showing the coöperation of the interlocking elements provided on the cylinder head support in coöperation with the piston, and Fig. 12 is a sectional view on line 12—12 of Fig. 7.

My improved device includes the cylinder 11 mounted upon a suitable base plate 12. This cylinder has the floating piston 13. Air is supplied to the cylinder through the tube 14 to force the piston upwardly to discharge the contents of the cylinder through one or more openings such as the opening 15 into sausage casings, as well understood. The cylinder is closed at its upper extremity by the cylinder head 16. This cylinder head is carried by the cylinder head framework 17, the details of which will presently be described more in detail. The cylinder head support ends in the downwardly extending bearing element 18 loosely encircling the shaft 19, which bearing element rests upon a supporting bracket 20 integral with the cylinder 11. A nut 21 holds the cylinder head support 17 rotatably upon the bracket 20, a sleeve 22 carried by the bracket 20 maintaining the axis of rotation of said cylinder head support constant about the axis preferably concentric with the axis of the shaft 19. This shaft 19 is moved by a piston 23 mounted within an auxiliary cylinder 24. A spring 25 of considerable length normally presses the piston 23 downwardly into its lowermost position at the bottom of the auxiliary cylinder 24. Air under pressure is supplied to the auxiliary cylinder by a pipe or tube 26. An intake pipe 27 leads from a source of pneumatic pressure supply to the control valve 28 and an exhaust pipe 29 having the valve 30 leads away from this valve structure 28, all as more clearly apparent hereinafter.

The valve structure 28 is suitably mounted on the cylinder 11 through the agency of the bolts 31. The cylinder head support 17 has a downwardly extending bolt 32 having the head 33, which bolt is adapted to enter the recess 34 provided in the bracket 35, this bracket extending from the cylinder 11. The head 33 is, as shown in Fig. 1, larger than the slot 34. This head has a downwardly extending lug 36 adapted to coöperate with a slide 37, this slide being slidably mounted in the bracket 35. This slide has a downwardly extending finger 38, which downwardly extending finger is adapted to coöperate with two projections 39, 39, provided upon the plate 40 forming part of the valve handle 41. A suitable retractile spring 42 normally forces this slide 37 into a position where the projection 38 is between the projections 39, 39, so as to prevent movement of the valve handle 41. When the cylinder head support however is in the position alining with the cylinder, then the bolt 32 has moved this slide 37 so that the projection 38 is no longer in line with the projections 39, and hence the valve handle 41 may be moved. The arrangement is such then that unless the cylinder head support is in position, and the cylinder head alining with the cylinder, that then the valve supplying pressure to the cylinder 11 cannot be moved. When they are thus alined, however, the first operation of the valve handle 41 causes the supply of pressure to the auxiliary cylinder 24, thereby moving its piston 23 against the action of the spring 25 to thereby lock the cylinder head 16 tightly in place. A further movement of the valve handle 41 causes the supply of pressure to the interior of the main cylinder 11, thus to permit the piston 13 to force the material out through the opening 15 and into the sausage casing or other container into which it is to be forced.

I will now describe the locking facilities by virtue of which the supply of air to the auxiliary cylinder 24 causes the cylinder head to be locked. The cylinder head 16 is fastened to a plurality of studs 43, 43, these studs entering pockets 44 provided upon the cylinder head support, these pockets furthermore having springs 45 tending normally to raise the cylinder head 16 upwardly away from the cylinder. The cylinder head is likewise provided with a roller 46 whose purpose will be presently apparent. The cylinder head support 17 likewise carries the slide 47, which slide is slidable upon the stud 48 and is normally pressed to the right (Fig. 1) by the spring 49. This slide 47 is furthermore held in its proper position by the roller 50 carried between the side frames 51 and 52 of the cylinder head support 17. This slide has a roller 53 at its right hand extremity adapted to coöperate with a cam 54, which cam is carried by the shaft 19. It requires considerable pressure to force the cylinder head 16 into position, and this force is exerted through the intermediation of a plurality of levers as will presently appear.

If the total movement of the cylinder head 16, however, were controlled solely by the movement of these levers, then there would have to be a very large movement of the prime mover, namely, the piston 23. In order to avoid this, the slide 47 having the cam surface as shown at 55 is employed. Normally, this slide 47 is to the right of the position shown in Fig. 1 so that the cylinder head 16 is drawn upwardly by the springs 45. The initial downward movement of the cylinder head 16 is caused by moving the slide 47 to the left into the position it occupies in Fig. 1 and this is done during the initial upward movement of the shaft 19, at which time the roller 53 moves along the inclined surface of the cam 54. There is thus a downward movement of the cylinder head 16 practically equal to the upward movement of the shaft 19. In the position shown, however, the cylinder head is not fully closed and to complete this small movement toward complete and absolute closure I employ certain levers operated by the shaft 19. One of these levers, namely the lever 56, is pivoted at 57 and has its right hand extremity under control of the upper extremity of the shaft 19. This lever 56 carries a roller 58, which roller passes downwardly against the left hand surface of the lever 59. This lever 59 is pivoted upon the stud 60 and has an intermediately mounted roller 61 pressing on top of the slide 47. Thus as the shaft 19 moves upwardly the roller 61 moves downwardly pressing the slide 47 downwardly against the roller 46 to thereby force the cylinder head 16 into position.

It may be stated, of course, that while the stud 48 holds the slide 47 substantially in position, it permits this slight downward movement, the roller 50 preventing a further upward movement than that shown in Fig. 1.

It will thus be seen that in order to securely close and force the cylinder head into position the initial movement of this cylinder head is practically equal to the movement of the piston 23. A short final closing movement however of the cylinder head requires a very much larger movement of the piston 23 due to the intermediatory action of the levers 56 and 59. Thus a largely amplified amount of power is available to force the cylinder head 16 into its final closing position, and this great amount of power is available without providing mechanism at the source which needs a very extended degree of movement. The plate 40 of the valve 41 has a plurality of notches 62, which notches coöperate with a locking element 63 pressed into position by the spring 64, this spring being held by the support 65. The locking element 63 limits the movement of the plate 40 by reason of its coöperation with the stops 67 and 68 provided thereon.

It will be seen that the handle 41 may be moved 45° in a contra-clockwise direction (referring to Fig. 3) and may be moved two steps of 45° each, or a total of 90° in a clockwise direction. This valve handle 41 may thus occupy its normal position as shown in Fig. 3, and reverse position when the stop 68 coöperates with a finger 66, or two forward positions, one in which the stop 67 coöperates with the finger 66, and an intermediate position half way between the normal and this latter position.

In the normal position the cylinder 11 and the cylinder 24 are exhausting. In the intermediate position, as above referred to, air under pressure is being supplied to the cylinder 24. In the second forward position, that is, the one in which the stop 67 abuts the finger 66, air is still being supplied to the auxiliary cylinder 24, but air is then also being supplied to the main cylinder 11 for the purpose of moving the floating piston 13. The reverse position of the handle 41 wherein the stop 68 coöperates with the finger 66 also serves to operate the valve to supply pressure to the cylinder 11.

When it is desired to remove the piston 13 for cleaning purposes, under these conditions, the cylinder head is swung about as shown in Fig. 11 so that the projections 69 do not overhang the interior periphery of the cylinder 11. It will be noted at this time that the slide 37 would prevent a movement of the handle 41 as the bolt 32 is not in its normal position, as shown in Figs. 1 and 2. In order therefore to operate the handle 41 in the reverse direction to supply pressure to the cylinder 11 and not to the cylinder 24, it is necessary to move the slide 37 by hand, thus giving an indication to the operator that he is performing a special actuation and must therefore be careful in his application of the pressure. This cleaning operation is done only periodically and then by some one who understands this operation.

In the normal operation of the device the handle 41 is moved only from its normal to its two forward positions and back to normal, and this handle 41 cannot be moved until the cylinder head support is in its closed position. Thereupon the first movement of the handle 41 locks the cylinder head 16 and the movement of the handle 41 into its second forward position supplies air to the main cylinder 11.

The valve structure 28 and its passages will be described more in detail by referring to Figs. 4, 5, 6, 7 and 12. This valve structure 28 has a valve 70 rigidly secured to the plate 40, and valve handle 41. This valve 70 has the exhaust channel 71, the channel 72 which controls the supply of air to the main cylinder 11, and the channel 73 having the communicating channel 74 at right angles thereto, the channels 73 and 74 coöperating to control the supply of air and exhaust of air from the auxiliary cylinder 24. The valve 70 is mounted within the casing 75, which casing has the port 76 leading through the agency of the pipe 14 into the main cylinder 11. The valve casing 75 further has the port 77 leading by means of the pipe 26 to the auxiliary cylinder. The valve casing 75 further has the port 78 leading from the source of air supply by way of the pipe 27. The valve casing 78 further has an exhaust port 79 leading outwardly through the pipe 29 and an exhaust port 80 is further provided from the valve casing through which the exhaust from the auxiliary cylinder may pass.

As before stated, the valve handle 41 is adapted to occupy a normal position, one reverse position, and two forward positions. The normal position is shown in Fig. 4 in which case the channel 73, 74 connects the auxiliary cylinder port 77 with the auxiliary exhaust port 80. At the same time the channel 71 connects the main cylinder port 76 with the main cylinder exhaust port 79. When the valve handle 41 is moved into its first forward position as shown in Fig. 5, then the channel 73 connects the air supply port 78 with the auxiliary cylinder port 77, thus supplying air to the auxiliary cylinder for locking the cylinder head 16 in position. No air is as yet supplied to the main cylinder as the channel 72 is not alined in proper position. It will be seen however in this position of Fig. 5 that the duct 71 still permits exhaust from the main cylinder. When moving the handle 41 into the second forward position, which is the position of Fig. 6, then the exhaust channel 71 no longer communicates with the port 76, but the channel 72 connects the air supply port 78 with the port 76, thus furnishing air to the interior of the cylinder 11. At the same time the channel 73 by reason of the alining of the opening provided for the inlet port 78 still furnishes air to the auxiliary cylinder 24 to hold the piston 23 in its cylinder head locking position during the time that air is being supplied to the main cylinder 11. When the material is all removed from the main cylinder then the valve handle 41 may be moved back to its starting position, which is the position of Fig. 4.

Now should it be desired to force the piston 13 out of the cylinder, then the cylinder head support 17 is moved into the position shown in Fig. 11. The operator then moves the slide 37 by hand so that the valve handle 41 may be moved into its reverse position, namely that shown in Fig. 12, at which time the channel 72 furnishes air from the port 78 to the main cylinder, but no air is furnished to the auxiliary cylinder 24. Under this special condition of operation, of course, the operator by reason of this special operation is cautious and furnishes only as much air to the main cylinder as is required to remove the piston 13.

It will thus be seen that I have provided a sausage stuffer in which automatic means are operable through the initial actuation of the control mechanism to lock the cylinder head in position, whereafter the floating piston of the stuffer is actuated to perform its function of ejecting the material. Furthermore, the control mechanism is not operable unless the cylinder head support 17 is in its closing position. In order to avoid accidents I provide a movable cover plate 81 hinged to the top of the support 17 which absolutely protects the operator against getting his fingers between the shaft 19 and the lever 56.

From what has been thus described the nature of my invention will be readily clear to those skilled in the art.

Having however thus described one form which my invention may take, what I claim as new and desire to secure by Letters Patent is:

1. A device of the character described comprising a main cylinder, a removable cylinder head therefor, means for locking said cylinder head in its closed position, a source of pressure supply, and control mechanism for controlling said means during its initial movement and for controlling the association of said source of pressure with said main cylinder during its subsequent movement.

2. A device of the character described comprising a main cylinder, a removable cylinder head therefor, means for locking said cylinder head in its closed position, a source of pressure supply, control mechanism for controlling said means during its initial movement and for controlling the association of said source of pressure with said main cylinder during its subsequent movement, and means to prevent actuation of said control mechanism when said cylinder head is not alined with said main cylinder.

3. A device of the character described comprising a main cylinder, a removable cylinder head therefor, means for locking said cylinder head in its closed position, said means including an auxiliary cylinder, a source of pressure supply, and control mechanism for controlling the association of said source of pressure with said auxiliary cylinder during its initial movement and for controlling the association of said source of pressure with said main cylinder during its subsequent movement.

4. A device of the character described comprising a main cylinder, a removable cylinder head therefor, means for locking said cylinder head in its closed position, said means including an auxiliary cylinder, a source of pressure supply, control mechanism for controlling the association of said source of pressure with said auxiliary cylinder during its initial movement and for controlling the association of said source of pressure with said main cylinder during its subsequent movement, and means to prevent actuation of said control mechanism when said cylinder head is not alined with said main cylinder.

5. A device of the character described comprising a main cylinder, a removable cylinder head therefor, means for locking said cylinder head in its closed position, a source of pressure supply, control mechanism for controlling said means during its initial movement and for controlling the association of said source of pressure with said main cylinder during its subsequent movement, a piston for said main cylinder, a cylinder head support, and obstructing means carried by said cylinder head support adapted to prevent removal of said piston unless said obstructing means are moved into a given predetermined position relative to said cylinder.

6. A device of the character described comprising a main cylinder, a removable cylinder head therefor, means for locking said cylinder head in its closed position, a source of pressure supply, control mechanism for controlling said means during its initial movement and for controlling the association of said source of pressure with said main cylinder during its subsequent movement, means to prevent actuation of said control mechanism when said cylinder head is not alined with said main cylinder, a piston for said main cylinder, a cylinder head support, and obstructing means carried by said cylinder head support adapted to prevent removal of said piston unless said obstructing means are moved into a given predetermined position relative to said cylinder.

7. A device of the character described comprising a main cylinder, a removable cylinder head therefor, means for locking said cylinder head in its closed position, said means including an auxiliary cylinder, a source of pressure supply, control mechanism for controlling the asociation of said source of pressure with said auxiliary cylinder during its initial movement and for controlling the association of said source of pressure with said main cylinder during its subsequent movement, a piston for said main cylinder, a cylinder head support, and obstructing means carried by said cylinder head support adapted to prevent removal of said piston unless said obstructing means are moved into a given predetermined position relative to said cylinder.

8. A device of the character described comprising a main cylinder, a removable cylinder head therefor, means for locking said cylinder head in its closed position, said means including an auxiliary cylinder, a source of pressure supply, control mechanism for controlling the association of said source of pressure with said auxiliary cylinder during its initial movement and for controlling the association of said source of pressure with said main cylinder during its subsequent movement, means to prevent actuation of said control mechanism when said cylinder head is not alined with said main cylinder, a piston for said main cylinder, a cylinder head support, and obstructing means carried by said cylinder head support adapted to prevent removal of said piston unless said obstructing means are moved into a given predetermined position relative to said cylinder.

9. A device of the character described comprising a main cylinder, a removable cylinder head therefor, means for locking said cylinder head in its closed position, said means including a movable element and mechanism interposed between said movable element and said cylinder head whereby said cylinder head is moved at substantially the same speed as said movable element during its initial movement, and is moved only a fractional amount of the movement of said movable element during the latter part of the movement of said movable element, a source of pressure supply, and control mechanism for controlling said means during its initial movement and for controlling the association of said source of pressure with said main cylinder during its subsequent movement.

10. A device of the character described comprising a main cylinder, a removable cylinder head therefor, means for locking said cylinder head in its closed position, said means including a movable element and mechanism interposed between said movable element and said cylinder head whereby said cylinder head is moved at substantially the same speed as said movable element during its initial movement, and is moved only a fractional amount of the movement of said movable element during the latter part of the movement of said movable element, a source of pressure supply, control mechanism for controlling said means during its initial movement and for controlling the association of said source of pressure with said main cylinder during its subsequent movement, and means to prevent actuation of said control mechanism when said cylinder head is not alined with said main cylinder.

11. A device of the character described comprising a main cylinder, a removable cylinder head therefor, means for locking said cylinder head in its closed position, said means including a movable element and mechanism interposed between said movable element and said cylinder head whereby said cylinder head is moved at substantially the same speed as said movable element during its initial movement, and is moved only a fractional amount of the movement of said movable element during the latter part of the movement of said movable element, a source of pressure supply, control mechanism for controlling said means during its initial movement and for controlling the association of said source of pressure with said main cylinder during its subsequent movement, a piston for said main cylinder, a cylinder head support, and obstructing means carried by said cylinder head support adapted to prevent removal of said piston unless said obstructing means are moved into a given predetermined position relative to said cylinder.

12. A device of the character described comprising a main cylinder, a removable cylinder head therefor, means for locking said cylinder head in its closed position, said means including a movable element and mechanism interposed between said movable element and said cylinder head whereby said cylinder head is moved at substantially the same speed as said movable element during its initial movement, and is moved only a fractional amount of the movement of said movable element during the latter part of the movement of said movable element, a source of pressure supply, control mechanism for controlling said means during its initial movement and for controlling the association of said source of pressure with said main cylinder during its subsequent movement, means to prevent actuation of said control mechanism when said cylinder head is not alined with said main cylinder, a piston for said main cylinder, a cylinder head support, and obstructing means carried by said cylinder head support adapted to prevent removal of said piston unless said obstructing means are moved into a given predetermined position relative to said cylinder.

13. A device of the character described comprising a main cylinder, a removable cylinder head therefor, means for locking said cylinder head in its closed position, said means including an auxiliary cylinder, a movable element and mechanism interposed between said movable element and said cylinder head whereby said cylinder head is moved at substantially the same speed as said movable element during its initial movement, and is moved only a fractional amount of the movement of said movable element during the latter part of the movement of said movable element, a source of pressure supply, and control mechanism for controlling the association of said source of pressure with said auxiliary cylinder during its initial movement and for controlling the association of said source of pressure with said main cylinder during its subsequent movement.

14. A device of the character described comprising a main cylinder, a removable cylinder head therefor, means for locking said cylinder head in its closed position, said means including an auxiliary cylinder, a movable element and mechanism interposed between said movable element and said cylinder head whereby said cylinder head is moved at substantially the same speed as said movable element during its initial movement, and is moved only a fractional amount of the movement of said movable element during the latter part of the movement of said movable element, a source of pressure supply, control mechanism for controlling the association of said source of pressure with said auxiliary cylinder during its initial movement and for controlling the association of said source of pressure with said main cylinder during its subsequent movement, and means to prevent actuation of said control mechanism when said cylinder head is not alined with said main cylinder.

15. A device of the character described comprising a main cylinder, a removable cylinder head therefor, means for locking said cylinder head in its closed position, said means including an auxiliary cylinder, a movable element and mechanism interposed between said movable element and said cylinder head whereby said cylinder head is moved at substantially the same speed as said movable element during its initial movement, and is moved only a fractional amount of the movement of said movable element during the latter part of the movement of said movable element, a source of pressure supply, control mechanism for controlling the association of said source of pressure with said auxiliary cylinder during its initial movement and for controlling the association of said source of pressure with said main cylinder during its subsequent movement, a piston for said main cylinder, a cylinder head support, and obstructing means carried by said cylinder head support adapted to prevent removal of said piston unless said obstructing means are moved into a given predetermined position relative to said cylinder.

16. A device of the character described comprising a main cylinder, a removable cylinder head therefor, means for locking said cylinder head in its closed position, said means including an auxiliary cylinder, a movable element and mechanism interposed between said movable element and said cylinder head whereby said cylinder head is moved at substantially the same speed as said movable element during its initial movement, and is moved only a fractional amount of the movement of said movable element during the latter part of the movement of said movable element, a source of pressure supply, control mechanism for controlling the association of said source of pressure with said auxiliary cylinder during its initial movement and for controlling the association of said source of pressure with said main cylinder during its subsequent movement, means to prevent actuation of said control mechanism when said cylinder head is not alined with said main cylinder, a piston for said main cylinder, a cylinder head support, and obstructing means carried by said cylinder head support adapted to prevent removal of said piston unless said obstructing means are moved into a given predetermined position relative to said cylinder.

17. A device of the character described comprising a main cylinder, a removable cylinder head therefor, means for locking said cylinder head in its closed position, a source of pressure supply, control mechanism for controlling said means during its initial movement and for controlling the association of said source of pressure with said main cylinder during its subsequent movement, a piston for said main cylinder, a cylinder head support, obstructing means carried by said cylinder head support adapted to prevent removal of said piston unless said obstructing means are moved into a given predetermined position relative to said cylinder, and yielding means whereby said cylinder head support carries said cylinder head.

18. A device of the character described comprising a main cylinder, a removable cylinder head therefor, means for locking said cylinder head in its closed position, a source of pressure supply, control mechanism for controlling said means during its initial movement and for controlling the association of said source of pressure with said main cylinder during its subsequent movement, means to prevent actuation of said control mechanism when said cylinder head is not alined with said main cylinder, a piston for said main cylinder, a cylinder head support, obstructing means carried by said cylinder head support adapted to prevent removal of said piston unless said obstructing means are moved into a given predetermined position relative to said cylinder, and yielding means whereby said cylinder head support carries said cylinder head.

19. A device of the character described comprising a main cylinder, a removable cylinder head therefor, means for locking said cylinder head in its closed position, said means including an auxiliary cylinder, a source of pressure supply, control mechanism for controlling the association of said source of pressure with said auxiliary cylinder during its initial movement and for controlling the association of said source of pressure with said main cylinder during its subsequent movement, a piston for said main cylinder, a cylinder head support, obstructing means carried by said cylinder head support adapted to prevent removal of said piston unless said obstructing means are moved into a given predetermined position relative to said cylinder, and yielding means whereby said cylinder head support carries said cylinder head.

20. A deivce of the character described comprising a main cylinder, a removable cylinder head therefor, means for locking said cylinder head in its closed position, said means including an auxiliary cylinder, a source of pressure supply, control mechanism for controlling the association of said source of pressure with said auxiliary cylinder during its initial movement and for controlling the association of said source of pressure with said main cylinder during its subsequent movement, means to prevent actuation of said control mechanism when said cylinder head is not alined with said main cylinder, a piston for said main cylinder, a cylinder head support, obstructing means carried by said cylinder head support adapted to prevent removal of said piston unless said obstructing means are moved into a given predetermined position relative to said cylinder, and yielding means whereby said cylinder head support carries said cylinder head.

21. In a device of the character described the combination with a main cylinder, a removable cylinder head therefor, a cylinder head support for carrying said cylinder head, and means operable when said cylinder head is alined with said cylinder for locking said cylinder head in position, said means including a movable element and mechanism interposed between said movable element and said cylinder head whereby said cylinder head is moved at substantially the same speed as said movable element during its initial movement, and is moved only a fractional amount of the movement of said movable element during the latter part of the movement of said movable element.

22. In a device of the character described the combination with a main cylinder, a removable cylinder head therefor, a cylinder head support for carrying said cylinder head, and means operable when said cylinder is alined with said cylinder for locking said cylinder head in position, said means including a movable element, a cam interposed between said movable element and said cylinder head, and lever mechanism interposed between said movable element and said cylinder head.

23. In a device of the character described the combination with a main cylinder, a removable cylinder head therefor, a cylinder head support for carrying said cylinder head, and means operable when said cylinder head is alined with said cylinder for locking said cylinder head in position, said means including a movable element a cam interposed between said movable element and said cylinder head, and lever mechanism interposed between said movable element and said cylinder head, said cam and lever mechanism being carried by said cylinder head support.

24. In a device of the character described the combination with a main cylinder, a removable cylinder head therefor, a cylinder head support for carrying said cylinder head, and means operable when said cylinder head is alined with said cylinder for locking said cylinder head in position, said means including a movable element, a sliding cam interposed between said movable element and said cylinder head, and lever mechanism interposed between said movable element and said cylinder head.

25. In a device of the character described the combination with a main cylinder, a removable cylinder head therefor, a cylinder head support for carrying said cylinder head, and means operable when said cylinder head is alined with said cylinder for locking said cylinder head in position, said means including a movable element, a sliding cam interposed between said movable element and said cylinder head, and lever mechanism interposed between said movable element and said cylinder head, said sliding cam and lever mechanism being carried by said cylinder head support.

26. In a device of the character described the combination with a main cylinder, a removable cylinder head therefor, a cylinder head support for carrying said cylinder head, and means operable when said cylinder head is alined with said cylinder for locking said cylinder head in position, said means including a movable element, a sliding cam interposed between said movable element and said cylinder head, lever mechanism interposed between said movable element and said cylinder head, and a cam interposed between said sliding cam and said movable element, said cam structure acting initially to move said cylinder toward its locking position and said lever mechanism being adapted to complete the movement of said cylinder head to its final position under increased pressure.

27. In a device of the character described the combination with a main cylinder, a removable cylinder head therefor, a cylinder head support for carrying said cylinder head, and means operable when said cylinder head is alined with said cylinder for locking said cylinder head in position, said means including a movable element, a sliding cam interposed between said movable element and said cylinder head, lever mechanism interposed between said movable element and said cylinder head, said sliding cam and lever mechanism being carried by said cylinder head support, and a cam interposed between said sliding cam and said movable element, said cam structure acting initially to move said cylinder toward its locking position and said lever mechanism being adapted to complete the movement of said cylinder head to its final position under increased pressure.

28. A device of the character described comprising a main cylinder, a removable cylinder head therefor, means for locking said cylinder head in its closed position, a source of pressure supply, and control mechanism for controlling said means during its initial movement and for controlling the association of said source of pressure with said main cylinder during its subsequent movement, said locking means maintaining said cylinder head in its closed locked position throughout the time of applying of pressure to said main cylinder.

29. A device of the character described comprising a main cylinder, a removable cylinder head therefor, means for locking said cylinder head in its closed position, a source of pressure supply, and control mechanism for conjointly controlling said means and the association of said source of pressure with said main cylinder.

30. A device of the character described comprising a main cylinder, a removable cylinder head therefor, means for locking said cylinder head in its closed position, a source of fluid pressure supply, and control mechanism interposed between said source and said means to control the actuations of said means.

31. A device of the character described comprising a main cylinder, a removable cylinder head therefor, means for locking said cylinder head in its closed position, a source of fluid pressure supply adapted to supply fluid to the interior of said cylinder and to actuate said means and control mechanism interposed between said source on the one hand and the main cylinder and means on the other.

In witness whereof, I hereunto subscribe my name this 10th day of March, A. D. 1917.

JOHN M. PETERSON.

Witnesses:
 HAZEL A. JONES,
 MAX W. ZABEL.

Copies of this patent may be obtained for five cents each, by addressing the "Commissioner of Patents, Washington, D. C."